US009044817B2

(12) United States Patent
Fukunaga et al.

(10) Patent No.: US 9,044,817 B2
(45) Date of Patent: Jun. 2, 2015

(54) ELECTRODE POSITION CONTROL METHOD FOR TANDEM ARC WELDING, ROBOT CONTROLLER FOR TANDEM ARC WELDING SYSTEM, AND TANDEM ARC WELDING SYSTEM

(75) Inventors: Atsushi Fukunaga, Fujisawa (JP); Takeshi Koike, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 520 days.

(21) Appl. No.: 13/099,783

(22) Filed: May 3, 2011

(65) Prior Publication Data
US 2011/0290771 A1   Dec. 1, 2011

(30) Foreign Application Priority Data
May 28, 2010   (JP) .................................. 2010-123088

(51) Int. Cl.
*B23K 9/10*   (2006.01)
*B23K 15/00*   (2006.01)
*B23K 9/173*   (2006.01)
*B23K 9/12*   (2006.01)

(52) U.S. Cl.
CPC .............. *B23K 9/1735* (2013.01); *B23K 9/126* (2013.01)

(58) Field of Classification Search
USPC ...... 219/130.01–130.33, 136, 137 R, 137 PS, 219/125.1, 125.12, 126
See application file for complete search history.

(56) References Cited

U.S. PATENT DOCUMENTS

| 4,631,385 A * | 12/1986 | Rothermel ................ 219/124.03 |
| 2008/0083716 A1* | 4/2008 | Shigeyoshi .............. 219/125.12 |
| 2009/0179021 A1* | 7/2009 | Nishimura et al. ........... 219/136 |

FOREIGN PATENT DOCUMENTS

| CN | 101157155 A | 4/2008 |
| JP | 54-124850 | 9/1979 |
| JP | 2003-285164 | 10/2003 |
| JP | 2007-307612 | 11/2007 |
| JP | 2008-93670 | 4/2008 |

OTHER PUBLICATIONS

Chinese Office Action issued Mar. 25, 2013, in China Patent Application No. 201110147027.X (with English translation).
Extended Search Report issued Jun. 11, 2014 in European Patent Application No. 11003719.9.

* cited by examiner

*Primary Examiner* — Sang Y Paik
(74) *Attorney, Agent, or Firm* — Oblon, McClelland, Maier & Neustadt, L.L.P.

(57) ABSTRACT

An electrode position control method according to the present invention includes a voltage detecting step of detecting voltages on a leading electrode and a trailing electrode that are brought into contact with a welding workpiece, a sensing step of detecting positional information of the welding workpiece from electrical changes in the voltages, a correction amount calculating step of calculating a correction amount for correcting for positional displacement of each of the leading electrode and the trailing electrode with respect to a weld line from the positional information, and a position correcting step of correcting the respective positions of the electrodes by adding or subtracting the correction amount.

7 Claims, 7 Drawing Sheets

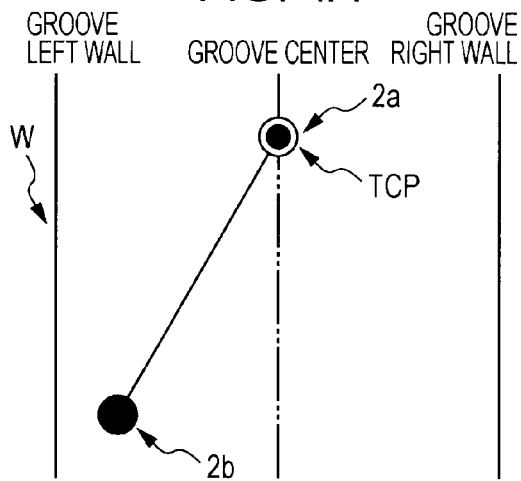
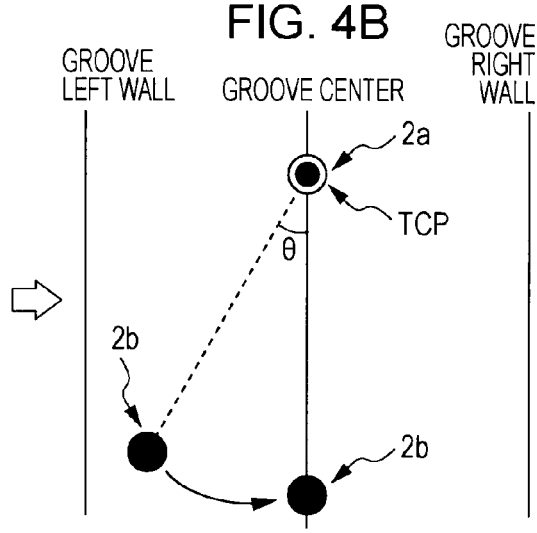
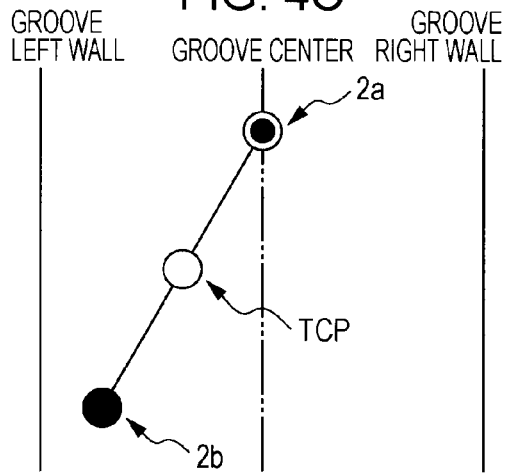
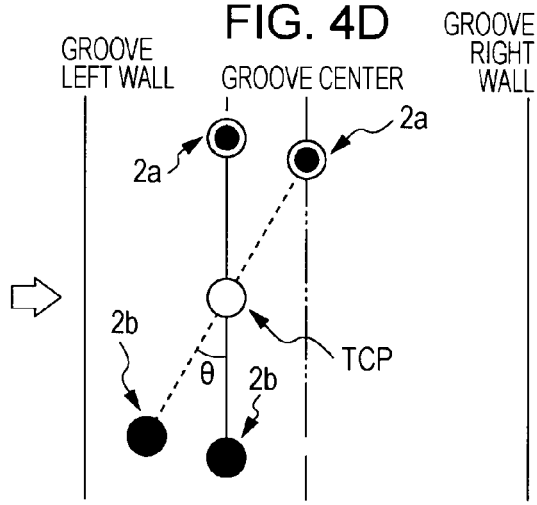
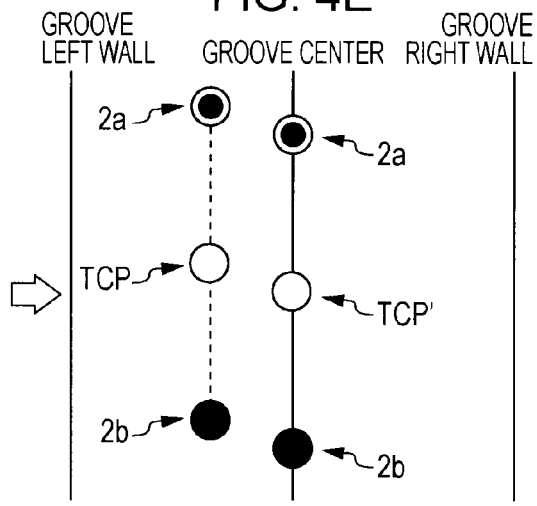

ELECTRODE POSITION CONTROL METHOD FOR TANDEM ARC WELDING, ROBOT CONTROLLER FOR TANDEM ARC WELDING SYSTEM, AND TANDEM ARC WELDING SYSTEM

BACKGROUND OF THE INVENTION

1. Field of the Invention

The present invention relates to an electrode position control method for tandem arc welding which controls the positions of a leading electrode and a trailing electrode with respect to a weld line (the groove center of a welding workpiece) prior to start of welding, a robot controller for a tandem arc welding system, and a tandem arc welding system.

2. Description of the Related Art

In tandem arc welding in which welding is carried out by using two electrodes including a leading electrode and a trailing electrode, as shown in FIG. 7A, it is necessary to align a leading electrode $2a$ and a trailing electrode $2b$ with a weld line previously taught as a welding target, that is, the groove center of a welding workpiece W, prior to start of welding.

With regard to such positional control of the electrodes prior to start of welding, for example, Japanese Unexamined Patent Application Publication No. 2007-307612 proposes a technique which detects the amounts of bending of the two electrodes by a reference jig located at a predetermined position prior to start of welding, and corrects the positions of the two electrodes with respect to an object to be welded (a welding workpiece) by using the detection results of the amounts of bending.

Also, Japanese Unexamined Patent Application Publication No. 54-124850 proposes a technique which performs sensing with a welding torch to determine the relative position of the welding torch with respect to an object to be welded prior to start of welding, and adjusts the welding torch to an appropriate welding position.

However, the technique proposed in Japanese Unexamined Patent Application Publication No. 2007-307612 lacks flexibility in implementation since the reference position can be used only at a predetermined position. Furthermore, although the technique enables detection of the degree of electrode bending, in situations where, as shown in FIG. 7B, the weld line is tilted with respect to the position as previously taught (see FIG. 7A), it is not possible to deal with such situations.

The technique proposed in Japanese Unexamined Patent Application Publication No. 54-124850 is a technique used in single arc welding. Hence, it is difficult to simply apply the technique to tandem arc welding. That is, in tandem arc welding, when a welding workpiece is placed at a position different from a previously taught position due to assembly errors or the like, as shown in FIG. 7B, the weld line is sometimes tilted with respect to the position as previously taught (see FIG. 7A). In this case, as shown in FIG. 7B, although application of the technique proposed in this patent application publication makes it possible to align the leading electrode $2a$ with the groove center position serving as the weld line, it is not possible to align the trailing electrode $2b$ with this groove center position.

If welding is started in such a state, the trailing electrode $2d$ is unable to weld the groove center position of the welding workpiece to be welded, leading to the possibility of a welding defect occurring in the round region bounded by the broken line in FIG. 7B, for example. For cases where the position of the weld groove differs from the position as previously taught (see FIG. 7A) as described above, there has been no technique available to date which corrects the welding start positions of both the leading electrode $2a$ and the trailing electrode $2b$ in accordance with the weld line.

SUMMARY OF THE INVENTION

The present invention has been made to solve the above-mentioned problems, and accordingly it is an object of the present invention to provide an electrode position control method for tandem arc welding, a robot controller for a tandem arc welding system, and a tandem arc welding system, with which even when the position of the weld line at the start of welding differs from the position as previously taught in tandem arc welding, the positions of a leading electrode and a trailing electrode can be appropriately corrected in accordance with the position of the weld line, thereby preventing a welding defect.

To achieve the above-mentioned object, an electrode position control method for tandem arc welding according to the present invention is an electrode position control method for tandem arc welding which controls positions of a leading electrode and a trailing electrode with respect to a weld line prior to start of welding, and includes a voltage detecting step of detecting voltages on the leading electrode and the trailing electrode that are brought into contact with a welding workpiece to be welded, a sensing step of detecting positional information of the welding workpiece from electrical changes in the voltages on the leading electrode and the trailing electrode detected in the voltage detecting step, a correction amount calculating step of calculating a correction amount for correcting for positional displacement of each of the leading electrode and the trailing electrode with respect to the weld line that has been previously taught, from the positional information of the welding workpiece detected in the sensing step, and a position correcting step of correcting the positions of the leading electrode and the trailing electrode with respect to the weld line, by adding or subtracting the correction amount calculated in the correction amount calculating step.

The electrode position control method for tandem arc welding described above can detect the relative position of the welding workpiece with respect to the leading electrode and the trailing electrode, by sensing the welding workpiece by using the leading electrode and the trailing electrode that are being applied with voltages. This makes it possible to detect whether or not the position of the welding workpiece being placed differs from a previously taught position, that is, the presence/absence and degree of positional displacement of each of the leading electrode and the trailing electrode with respect to the weld line (the groove center position of the welding workpiece). Then, by calculating a correction amount on the basis of the detected degree of positional displacement, the positions of the leading electrode and trailing electrode with respect to the weld line can be corrected appropriately in accordance with the position of the weld line.

It is preferable that in the electrode position control method for tandem arc welding according to the present invention, the voltage detecting step detect voltages when touch sensing left and right walls of a groove of the welding workpiece by the leading electrode and the trailing electrode, the sensing step detect a groove center position of the welding workpiece, from the electrical changes in the voltages on the leading electrode and the trailing electrode detected in the voltage detecting step, the correction amount calculating step include a leading electrode correction amount calculating step of calculating a leading electrode correction amount for correcting for positional displacement of the leading electrode, from the groove center position calculated in the sensing step, and a current position of the leading electrode, and a trailing electrode correction amount calculating step of calculating a trailing electrode correction amount for correcting for positional displacement of the trailing electrode, from the groove center position calculated in the sensing step, a current position of the trailing electrode, and a distance between the leading electrode and the trailing electrode, and the position correcting step correct the positions of the leading electrode and the trailing electrode with respect to the weld line by adding or subtracting the leading electrode correction amount and the trailing electrode correction amount, respectively.

The electrode position control method for tandem arc welding described above can detect the groove center position of the welding workpiece with respect to the leading electrode and the trailing electrode, by touch sensing the left and right walls of the groove of the welding workpiece by using the leading electrode and the trailing electrode that are being applied with voltages. Then, by comparing this groove center position with the current positions of the leading electrode and trailing electrode, it is possible to detect the presence/absence and degree of positional displacement of each of the leading electrode and the trailing electrode with respect to the weld line. Then, by calculating a correction amount on the basis of the detected degree of positional displacement, the positions of the leading electrode and trailing electrode with respect to the weld line can be corrected more appropriately in accordance with the position of the weld line.

It is preferable that in the electrode position control method for tandem arc welding according to the present invention, the voltage detecting step perform touch sensing on the left and right walls of the groove of the welding workpiece by the leading electrode and the trailing electrode, while moving the welding torch linearly with respect to the weld line, or rotating the welding torch about a predetermined rotation center.

The electrode position control method for tandem arc welding described above can change the method of moving the welding torch during touch sensing in accordance with the shape of the groove of the welding workpiece. Therefore, the presence/absence and degree of positional displacement of each of the leading electrode and the trailing electrode with respect to the weld line can be detected irrespective of the shape of the groove of the welding workpiece. Then, by calculating a correction amount on the basis of the detected degree of positional displacement, the positions of the leading electrode and trailing electrode with respect to the weld line can be corrected more appropriately in accordance with the position of the weld line.

It is preferable that in the electrode position control method for tandem arc welding according to the present invention, the correction amount calculating step further include a rotation center correction amount calculating step of calculating a rotation center correction amount for correcting for positional displacement of the leading electrode which occurs due to the correction of the position of the trailing electrode in the position correcting step, and the position correcting step correct the positions of the leading electrode and the trailing electrode with respect to the weld line, and a rotation center of the welding torch, by adding or subtracting the leading electrode correction amount, the trailing electrode correction amount, and the rotation center correction amount, respectively.

The electrode position control method for tandem arc welding described above calculates, in addition to the leading electrode correction amount and the trailing electrode correction amount, the rotation center correction amount for correcting the rotation center of the welding torch to thereby also correct the rotation center of the welding torch. Consequently, even when the position of the trailing electrode is corrected by using an arbitrary rotation center, no displacement occurs in the position of the leading electrode due to the position correction of the trailing electrode. Therefore, the positions of the leading electrode and trailing electrode with respect to the weld line can be corrected with greater reliability in accordance with the position of the weld line.

It is preferable that in the electrode position control method for tandem arc welding according to the present invention, the rotation center correction amount calculating step calculate a reference position of the leading electrode, from a distance between the leading electrode and the rotation center of the welding torch, and torch attitude information indicating an attitude of the welding torch with reference to a robot to a tip of which the welding torch is attached, and calculate the rotation center correction amount from the reference position of the leading electrode and the trailing electrode correction amount, by determining a difference between a position of the leading electrode before correction is made using the trailing electrode correction amount, and a position of the leading electrode after correction is made using the trailing electrode correction amount.

The electrode position control method for tandem arc welding described above can easily calculate the rotation center correction amount for correcting for positional displacement of the leading electrode with respect to the weld line which occurs or is supposed to occur due to position correction of the trailing electrode using the trailing electrode correction amount, by using the distance between the leading electrode and the rotation center of the welding torch, torch attitude information, and the trailing electrode correction amount.

To achieve the above-mentioned object, a tandem arc welding system according to the present invention is a tandem arc welding system which performs welding while following a weld line, and includes a welding torch having a leading electrode and a trailing electrode arranged at a predetermined inter-electrode distance in a direction in which welding proceeds, a robot that moves or rotates the welding torch attached to its tip with respect to the weld line; a welding power supply that supplies power to the leading electrode and the trailing electrode, a current/voltage detector that detects at least one of currents and voltages on the leading electrode and the trailing electrode, and a robot controller that controls positions of the leading electrode and the trailing electrode with respect to the weld line prior to start of welding. The robot controller includes a sensing processing section that detects positional information of a welding workpiece to be welded, from electrical changes in the voltages on the leading electrode and the trailing electrode detected by the current/voltage detector, a correction amount calculation processing section that calculates a correction amount for correcting for positional displacement of each of the leading electrode and the trailing electrode with respect to the weld line that has been previously taught, from the positional information of the welding workpiece, and a robot path planning processing section that corrects the positions of the leading electrode and the trailing electrode with respect to the weld line, by adding or subtracting the correction amount.

The tandem arc welding system described above can detect the relative position of the welding workpiece with respect to the leading electrode and the trailing electrode, by sensing the welding workpiece by using the leading electrode and the trailing electrode that are being applied with voltages. This makes it possible to detect whether or not the position of the welding workpiece being placed differs from a previously taught position, that is, the presence/absence and degree of positional displacement of each of the leading electrode and the trailing electrode with respect to the weld line (the groove center position of the welding workpiece). Then, by calculating a correction amount on the basis of the detected degree of positional displacement, the positions of the leading electrode and trailing electrode with respect to the weld line can be corrected appropriately in accordance with the position of the weld line.

A robot controller used in the above-mentioned tandem arc welding system also falls within the scope of the present invention.

With the electrode position control method, the robot controller for a tandem arc welding system, and the tandem arc welding system according to the present invention, even when the position of the weld line at the start of welding differs from the position as previously taught in tandem arc welding, the positions of the leading electrode and trailing electrode can be corrected appropriately in accordance with the position of the weld line. Therefore, a welding defect resulting from positional displacement of each of the leading electrode and the trailing electrode with respect to the weld line can be prevented appropriately.

BRIEF DESCRIPTION OF THE DRAWINGS

FIGS. 4A through 4E are schematic diagrams showing an overview of position correction for each TCP, of which FIG. 4A is a diagram showing the flow of position correction in the case where TCP is set at a leading electrode, FIG. 4B is a diagram showing the flow of position correction in the case where TCP is set at the middle between the leading electrode and a trailing electrode, FIG. 4C, is a diagram showing the flow of position correction in the case where TCP is set at the middle between the leading electrode and the trailing electrode, FIG. 4D is a diagram showing the flow of position correction in the case where the position of the trailing electrode is corrected by using the trailing electrode correction amount with this TCP taken as an axis, positional displacement occurs in the leading electrode, and 4E shows the position of the trailing electrode being corrected using an arbitrary rotation center;

FIGS. 6A and 6B are schematic diagrams showing an example of the sensing operations of a leading electrode and a trailing electrode according to an embodiment of the present invention, of which FIG. 6A is a diagram showing the sensing operation of the leading electrode with respect to a welding workpiece, and FIG. 6B is a diagram showing the sensing operation of the trailing electrode with respect to the welding workpiece; and FIGS. 7A to 7C are diagrams for explaining an example of the positional relationship of the leading electrode and the trailing electrode with respect to a weld line, of which FIG. 7A is a diagram showing a position as previously taught, FIG. 7B is a diagram showing a case where the weld line is tilted with respect to the position as previously taught and there is no correction to be made for the trailing electrode, and FIG. 7C is a diagram showing a case where the weld line is tilted with respect to the position as previously taught and there is correction to be made for the trailing electrode.

DESCRIPTION OF THE PREFERRED EMBODIMENTS

Hereinbelow, an electrode position control method for tandem arc welding (hereinafter, abbreviated as electrode position control method), a robot controller for a tandem arc welding system (hereinafter, abbreviated as robot controller), and a tandem arc welding system according to an embodiment of the present invention will be described with reference to the drawings. In the following, the tandem arc welding system and the robot controller as a component of the system will be described first, and then the electrode position control method will be described.

<Tandem Arc Welding System>

Figure 1:
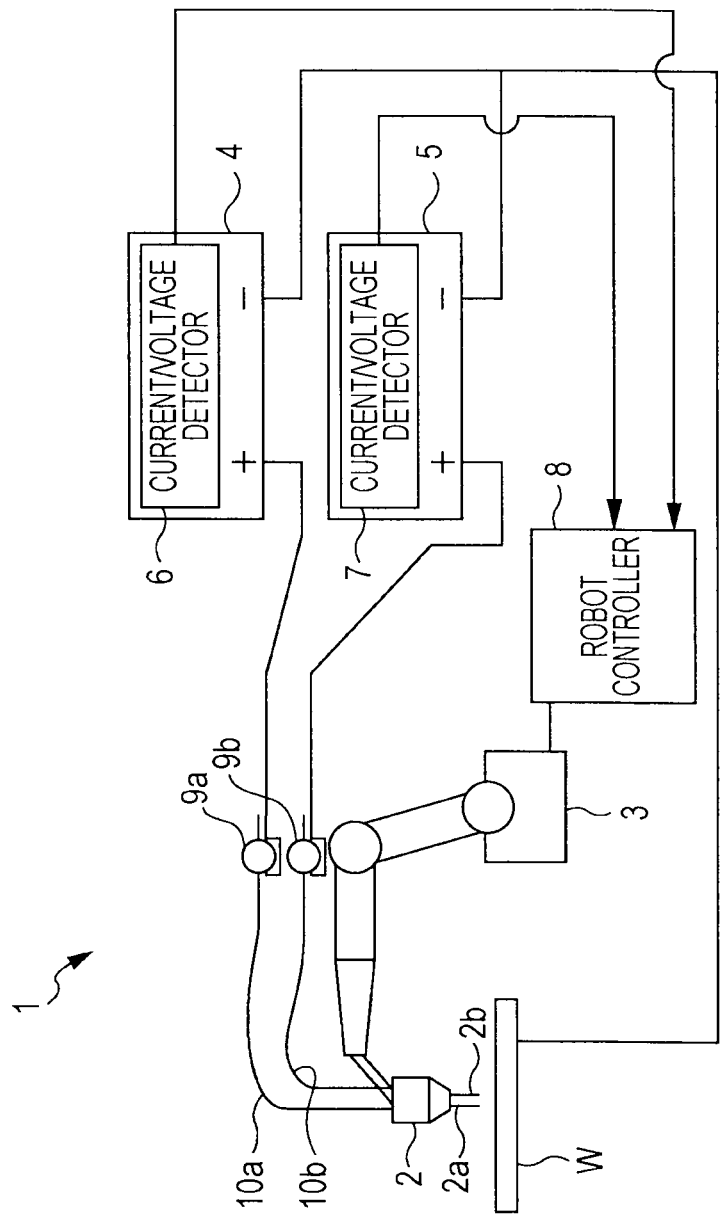
FIG. 1 is a schematic diagram showing the entirety of a tandem arc welding system according to an embodiment of the present invention.

A tandem arc welding system 1 is a system which carries out arc welding by following a weld line, while causing two electrodes to weave to the left and right with respect to the direction in which welding of a welding workpiece W proceeds. Here, a weld line means an imaginary line running along the groove center of the welding workpiece W to be welded, which is previously taught by a robot controller 8 described later. As shown in FIG. 1, the tandem arc welding system 1 includes, as its main components, a welding torch 2 including a leading electrode 2a and a trailing electrode 2b, a robot 3, welding power supplies 4 and 5, current/voltage detectors 6 and 7, a robot controller 8, and feed motors 9a and 9b. These components will be described below.

The welding torch 2 includes the leading electrode 2a and the trailing electrode 2b at its tip. The leading electrode 2a is arranged toward the front in the direction in which welding proceeds. The trailing electrode 2b is arranged toward the rear in the direction in which welding proceeds, at a predetermined inter-electrode distance (for example, 10 to 30 mm) from the leading electrode 2a. Preferably, the leading electrode 2a and the trailing electrode 2b act as consumable electrodes, and are formed by inserting welding wires 10a and 10b into a leading electrode torch and a trailing electrode torch (not shown) that are tubular-shaped, respectively, and making the welding wires project from the tips of the respective torches by predetermined projection lengths (for example, 20 to 35 mm). The welding wires 10a and 10b are supplied from the feed motors 9a and 9b, respectively. As each of the welding wires 10a and 10b, a welding wire having a predetermined composition is selected as appropriate in accordance with the material of the welding workpiece W, the manner of welding, and the like. For example, a welding wire that contains a predetermined amount of C, Si, Mn, Ti, S, and O, and includes Fe and inevitable impurities as the remainder is used.

The welding torch 2 may include a shielding gas nozzle. As the shielding gas, a shielding gas with an inert gas-rich composition is used, such as $Ar+CO^2$, $Ar+He+O$, or $Ar+He+CO^2$.

As shown in FIG. 1, the robot 3 is used to attach the welding torch 2 to its tip, and move the welding torch 2 up and down and to the left and right with respect to the weld line or rotate the welding torch 2 about a predetermined rotation center. At the time of actual welding, the robot 3 weaves the welding torch 2 to the left and right with respect to the direction of the weld line. This weaving is controlled by driving individual axes of the robot 3, and the control is carried out by the robot controller 8 described later.

The welding power supplies 4 and 5 supply electric power to the leading electrode 2a, the trailing electrode 2b, and the welding workpiece W. Here, unlike at the time of actual welding, the welding power supplies 4 and 5 apply a predetermined magnitude of voltage that does not generate an arc, between the leading electrode 2a and the welding workpiece W and between the trailing electrode 2b and the welding workpiece W.

The current/voltage detectors (current/voltage detecting means) 6 and 7 detect currents and/or voltages on the leading electrode 2a and the trailing electrode 2b, respectively. Here, the current/voltage detectors 6 and 7 detect voltages on the leading electrode 2a and the trailing electrode 2b which are applied with voltages by the welding power supplies 4 and 5 and are brought into contact with a predetermined part of the welding workpiece W in that state, respectively.

In this way, by sensing the welding workpiece W by using the leading electrode 2a and the trailing electrode 2b that are being applied with voltages, the robot controller 8 and the tandem arc welding system 1 according to an embodiment can detect the relative position of the welding workpiece W with respect to the leading electrode 2a and the trailing electrode 2b. This makes it possible to detect whether or not the position of the welding workpiece W being placed differs from a previously taught position, that is, the presence/absence and degree of positional displacement of each of the leading electrode 2a and the trailing electrode 2b with respect to the weld line.

It should be noted that while in this example the current/voltage detectors 6 and 7 are provided inside the welding power supplies 4 and 5 as shown in FIG. 1, the current/voltage detectors 6 and 7 may be provided outside the welding power supplies 4 and 5, respectively.

Figure 6A:
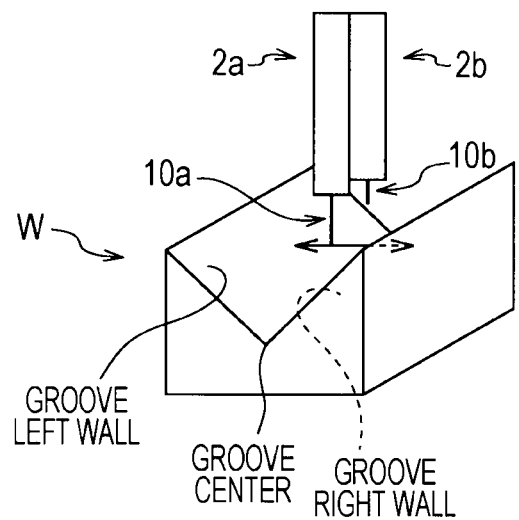
Figure 6B:
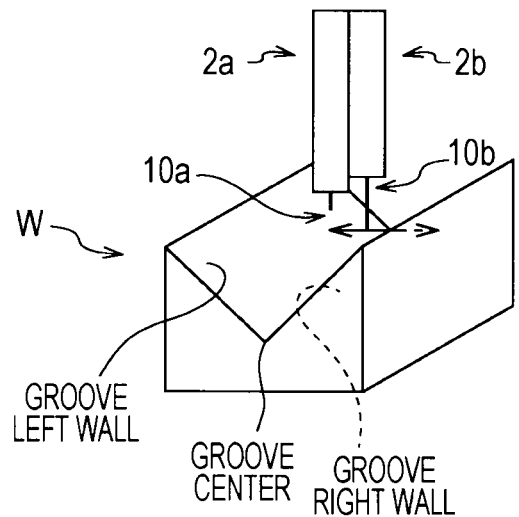

It is preferable that as shown in FIGS. 6A and 6B described later, the current/voltage detectors 6 and 7 detect the voltages when touch sensing the left and right walls of the groove of the welding workpiece W by the leading electrode 2a and the trailing electrode 2b. By touch sensing the left and right walls of the groove of the welding workpiece W using the leading electrode 2a and the trailing electrode 2b that are being applied with voltages in this way, the robot controller 8 and the tandem arc welding system 1 according to an embodiment can detect the groove center position of the welding workpiece W with respect to the leading electrode 2a and the trailing electrode 2b. Then, by comparing the groove center position with the current positions of the leading electrode 2a and trailing electrode 2b as well be described later, it is possible to detect the presence/absence and degree of positional displacement of each of the leading electrode 2a and the trailing electrode 2b with respect to the weld line.

It is preferable that the current/voltage detectors 6 and 7 detect the voltages when touch sensing the left and right walls of the groove of the welding workpiece W by the leading electrode 2a and the trailing electrode 2b, while causing the welding torch 2 to move linearly with respect to the weld line or to rotate about a predetermined rotation center. The robot controller 8 and the tandem arc welding system 1 according to an embodiment can change the method of moving the welding torch 2 in accordance with the shape of the groove of the welding workpiece W, by performing touch sensing while moving the welding torch 2 linearly with respect to the weld line or rotating the welding torch 2 about a predetermined rotation center in this way. Therefore, the presence/absence and degree of positional displacement of each of the leading electrode 2a and the trailing electrode 2b with respect to the weld line can be detected irrespective of the shape of the groove of the welding workpiece W.

Figure 2:
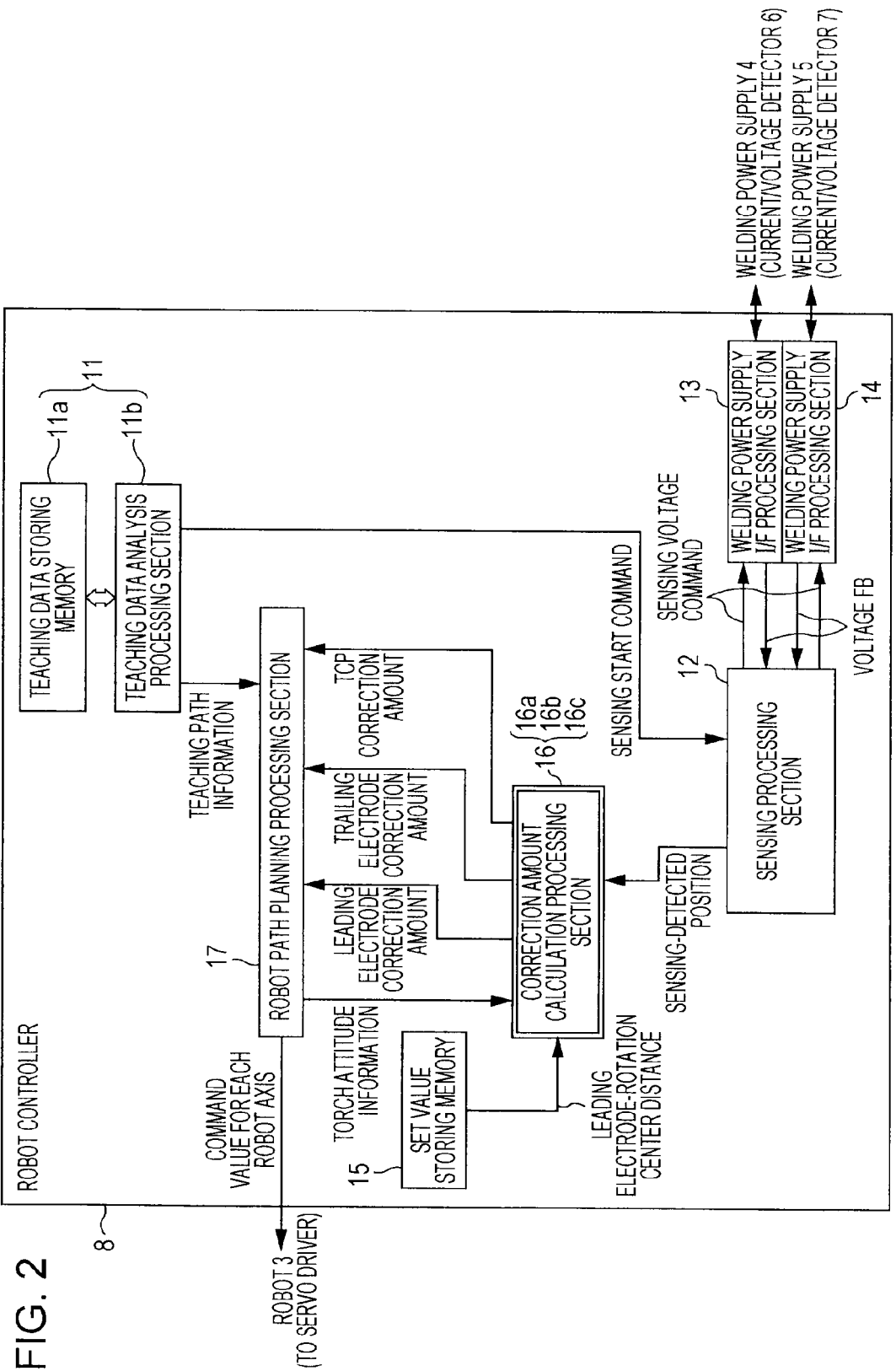
FIG. 2 is a block diagram showing the internal configuration of a robot controller according to an embodiment of the present invention.

The robot controller 8 controls the positions of the leading electrode 2a and trailing electrode 2b of the welding torch 2 with respect to the weld line prior to start of welding. The robot controller 8 controls the position of the welding torch 2 via the robot 3 on the basis of electrical changes in the voltages on the leading electrode 2a and the trailing electrode 2b detected by the current/voltage detectors 6 and 7, respectively. Here, electrical changes in the voltages on the leading electrode 2a and the trailing electrode 2b specifically mean changes such as voltage drops. As shown in FIG. 2, the robot controller 8 includes a teaching data section 11, a sensing processing section 12, welding power supply I/F processing sections 13 and 14, a set value storing memory 15, a correction amount calculation processing section 16, and a robot path planning processing section 17. These components will be described below.

The teaching data section (teaching data means) 11 holds teaching data including the patterns of predetermined operations performed by the robot 3, and positional information such as the position of the weld line, the welding start position, and the welding end position. The teaching data section 11 teaches these pieces of data to the welding torch 2 in advance. The teaching data section 11 extracts teaching path information from a teaching data storing memory 11a prior to start of welding. The teaching path information includes data such as positional information such as the position of the weld line (the groove center of the welding workpiece W) as a welding target, the welding start position, and the welding end position. Then, as shown in FIG. 2, the teaching data section 11 outputs the teaching path information to the robot path planning processing section 17 via a teaching data analysis processing section 11b.

Also, as shown in FIG. 2, the teaching data section 11 outputs a sensing start command to the sensing processing section 12 prior to start of welding. The sensing start command is a command for starting a sensing process with respect to the welding workpiece W.

The sensing processing section (sensing processing means) 12 detects positional information of the welding workpiece W, from electrical changes in the voltages on the leading electrode 2a and the trailing electrode 2b detected by the current/voltage detectors 6 and 7. It should be noted that a series of processes carried out to detect positional information of the welding workpiece W from electrical changes in the voltages on the leading electrode 2a and the trailing electrode 2b that are brought into contact with the welding workpiece W in this way will be herein referred to as sensing process. While the sensing processing section 12 can detect all kinds of positional information of the welding workpiece W from electrical changes in the voltages on the leading electrode 2a and the trailing electrode 2b, this embodiment uses positional information such as the groove center position, groove left-wall position, and groove right-wall position of the welding workpiece W, among those positional information.

As shown in FIG. 2, when a sensing start command is inputted from the teaching data section 11 mentioned above, the sensing processing section 12 outputs a sensing voltage command to each of the welding power supplies 4 and 5, via the welding power supply I/F processing sections (welding power supply I/F processing means) 13 and 14 that perform an interfacing process with the welding power supplies 4 and 5, respectively. Herein, a sensing voltage command refers to a command describing the value of voltage to be applied to each of the leading electrode 2a and the trailing electrode 2b when performing a sensing process. Then, the welding power supplies 4 and 5, to each of which the sensing voltage command has been inputted, apply the commanded voltages to the leading electrode 2a and the trailing electrode 2b, respectively. Also, the current/voltage detectors 6 and 7 detect the voltages on the leading electrode 2a and the trailing electrode 2b that are brought into contact with a predetermined part of the welding workpiece W, and feed these voltages back to the sensing processing section 12 whenever necessary via the welding power supply I/F processing sections 13 and 14, respectively.

Upon receiving the feedback of the voltages on the leading electrode 2a and the trailing electrode 2b from the current/voltage detectors 6 and 7, respectively, the sensing processing section 12 observes electrical changes such as voltage drops in the voltages, thereby detecting positional information of the welding workpiece W. Then, the sensing processing section 12 outputs the positional information of the welding workpiece W detected in this way to the correction amount calculation processing section 16 as a sensing-detected position.

Since the specific method of detecting positional information of the welding workpiece W from electrical changes in the voltages on the leading electrode 2a and the trailing electrode 2b is already known, description thereof is omitted herein. It should be noted that the sensing processing section 12 includes storage means (not shown) for storing voltages fed back from the current/voltage detectors 6 and 7, and positional information of the welding workpiece W detected from electrical changes in the voltages.

The set value storing memory 15 previously holds leading electrode-rotation center distance, which is the distance between the leading electrode 2a of the welding torch 2 and the rotation center of the welding torch 2. Specifically, this leading electrode-rotation center distance is held in the form of data representing the distance from the leading electrode 2a to the rotation center of the welding torch 2 by a vector on a tool coordinate system that is a system of coordinates of the welding torch 2. When a sensing process is started, as shown in FIG. 2, the set value storing memory 15 outputs this leading electrode-rotation center distance to the correction amount calculation processing section 16.

The correction amount calculation processing section (correction amount calculation processing means) 16 calculates a correction amount for correcting for positional displacement of each of the leading electrode 2a and the trailing electrode 2b with respect to a previously taught weld line, from positional information of the welding workpiece W. When the position of the weld line at the start of welding differs from the position as previously taught, and it is necessary to correct the positions of the leading electrode 2a and trailing electrode 2b in accordance with the position of the weld line, as shown in FIG. 2, the correction amount calculation processing section 16 calculates three correction amounts including a leading electrode correction amount, a trailing electrode correction amount, and a rotation center correction amount (TCP correction amount), and outputs these correction amounts to the robot path planning processing section 17.

Figure 7A:
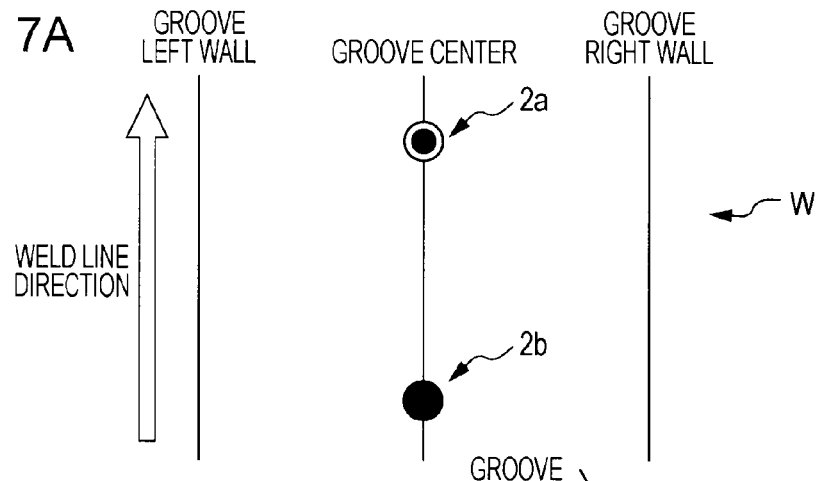
Figure 7B:
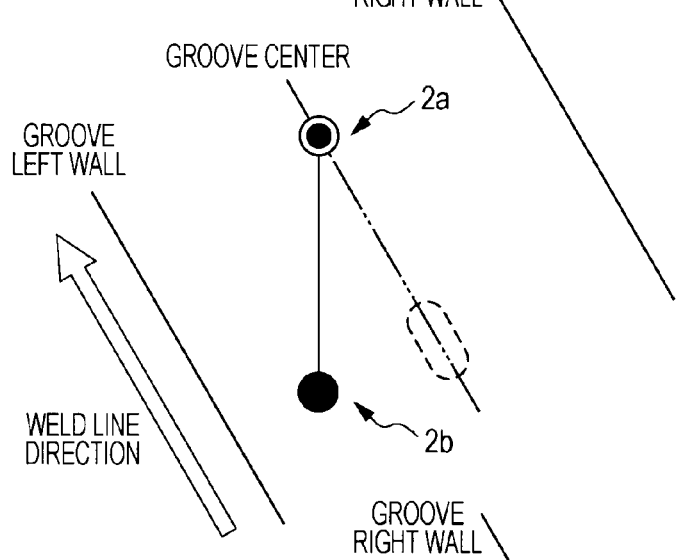
Figure 7C:
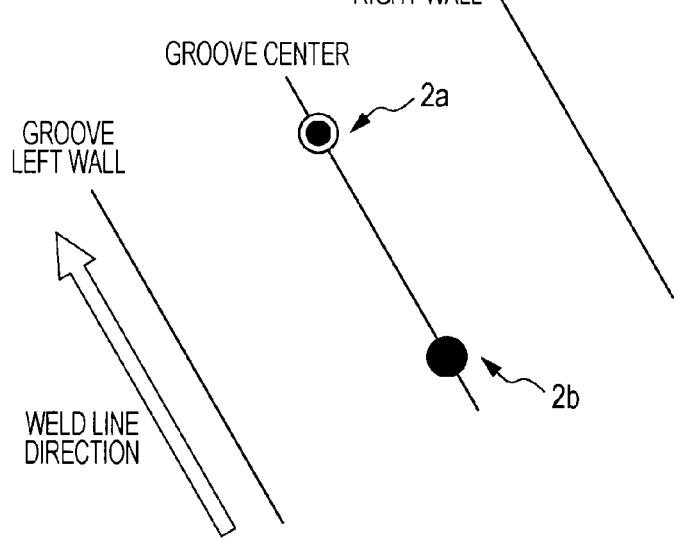

At this time, the correction amount calculation processing section 16 does not always calculate the three correction amounts mentioned above. For example, the correction amount calculation processing section 16 does not calculate the leading electrode correction amount in the case where, as shown in FIG. 7B, only the position of the trailing electrode 2b is displaced with respect to the weld line, and no position correction is necessary for the leading electrode 2a. As shown in FIG. 2, the correction amount calculation processing section 16 includes a leading electrode correction amount calculating section 16a, a trailing electrode correction amount calculating section 16b, and a rotation center correction amount calculating section 16c.

The leading electrode correction amount calculating section (leading electrode correction amount calculating means) 16a calculates a leading electrode correction amount for correcting for positional displacement of the leading electrode 2a with respect to the weld line, from the groove center position of the welding workpiece W detected by the sensing processing section 12, and the current position of the leading electrode 2a. At this time, as shown in FIG. 2, the groove center position of the welding workpiece W is inputted from the sensing processing section 12 to the leading electrode correction amount calculating section 16a as a sensing-detected position. Also, the current position of the leading electrode 2a is acquired through a sensing process by the sensing processing section 12, and is inputted to the leading electrode correction amount calculating section 16a (not shown). Since the specific procedure for calculating a leading electrode correction amount is already known, description thereof is omitted herein.

The trailing electrode correction amount calculating section (trailing electrode correction amount calculating means) 16b calculates a trailing electrode correction amount for correcting for positional displacement of the trailing electrode 2b with respect to the weld line, from the groove center position of the welding workpiece W detected by the sensing processing section 12, the current position of the trailing electrode 2b, and the distance between the leading electrode 2a and the trailing electrode 2b. At this time, as shown in FIG. 2, the groove center position of the welding workpiece W is inputted from the sensing processing section 12 to the trailing electrode correction amount calculating section 16b as a sensing-detected position. Also, the current position of the trailing electrode 2b is acquired through a sensing process by the sensing processing section 12, and is inputted to the trailing electrode correction amount calculating section 16b (not shown). Also, the distance between the leading electrode 2a and the trailing electrode 2b is held in advance in storage means (not shown) inside the robot controller 8, and is inputted to the trailing electrode correction amount calculating section 16b (not shown). The specific procedure for calculating a trailing electrode correction amount will be described later.

The rotation center correction amount calculating section (rotation amount correction amount calculating means) 16c calculates a rotation center correction amount from a reference position of the leading electrode 2a, and a trailing electrode correction amount, by determining the difference between the position of the leading electrode 2a before correction is made using the trailing electrode correction amount, and the position of the leading electrode 2a after correction is made using the trailing electrode correction amount. At this time, the reference position of the leading electrode 2a is calculated from the distance between the leading electrode 2a and the rotation center (TCP) of the welding torch 2, and torch attitude information indicating the attitude of the welding torch 2 with reference to the robot 3 to the tip of which the welding torch 2 is attached. Also, as shown in FIG. 2, the distance between the leading electrode 2a and the rotation center of the welding torch 2 is held in advance in the set value storing memory 15, and is inputted to the rotation center correction amount calculating section 16c. Also, the torch attitude information is held in advance in the robot path planning processing section 17, and is inputted to the rotation center correction amount calculating section 16c. The specific procedure for calculating a rotation center correction amount will be described later.

In this way, the robot controller 8 and the tandem arc welding system 1 according to an embodiment calculate, in addition to the leading electrode correction amount and the trailing electrode correction amount, the rotation center correction amount for correcting the rotation center of the welding torch 2 to thereby also correct the rotation center of the welding torch 2. Thus, even when the position of the trailing electrode 2b is corrected by using an arbitrary rotation center, no displacement occurs in the position of the leading electrode 2a due to the position correction of the trailing electrode 2b. Therefore, the positions of the leading electrode 2a and trailing electrode 2b with respect to the weld line can be corrected with greater reliability in accordance with the position of the weld line.

Also, by using the distance between the leading electrode 2a and the rotation center of the welding torch 2, torch attitude information, and the trailing electrode correction amount in this way, the robot controller 8 and the tandem arc welding system 1 according to an embodiment can easily calculate the rotation center correction amount for correcting for positional displacement of the leading electrode 2a with respect to the weld line which occurs or is supposed to occur due to position correction of the trailing electrode 2b using the trailing electrode correction amount.

The robot path planning processing section (robot path planning processing means) 17 corrects the positions of the leading electrode 2a and trailing electrode 2b with respect to the weld line, by adding or subtracting the individual correction amounts inputted from the correction amount calculation processing section 16. Specifically, as shown in FIG. 2, the robot path planning processing section 17 adds or subtracts the leading electrode correction amount, the trailing electrode correction amount, and the rotation center correction amount to or from the welding start position contained in teaching path information previously inputted from the teaching data section 11, that is, positional data of the leading electrode 2a with respect to the weld line, positional data of the trailing electrode 2b, and positional data of the rotation center, respectively, thereby correcting the corresponding pieces of positional data.

Then, the robot path planning processing section 17 sends the corrected start position to a servo driver for the robot 3 as a command value for each axis of the robot 3, and controls the respective positions of the leading electrode 2a and trailing electrode 2b of the welding torch 2 attached to the tip of the robot 3 with respect to the weld line direction.

With the robot controller 8 and the tandem arc welding system 1 according to an embodiment of the present invention configured as described above, even when the position of the weld line at the start of welding differs from the position as previously taught in tandem arc welding, the positions of the leading electrode 2a and trailing electrode 2b can be corrected appropriately in accordance with the position of the weld line. Therefore, a welding defect resulting from positional displacement of each of the leading electrode 2a and the trailing electrode 2b with respect to the weld line can be prevented appropriately.

<Electrode Position Control Method>

Hereinbelow, the operations of the robot controller 8 and the tandem arc welding system 1 mentioned above, that is, an electrode position control method will be described in detail. In the following description, components that have been already described are denoted by the same symbols, and description thereof is omitted.

The electrode position control method according to an embodiment is a method for controlling the positions of the leading electrode 2a and trailing electrode 2b with respect to the weld line of the welding workpiece W prior to start of welding. The electrode position control method is roughly divided into a voltage detecting step, a sensing step, a correction amount calculating step, and a position correcting step. These individual steps will be described below.

(1) Voltage Detecting Step

The voltage detecting step is a step of detecting voltages on the leading electrode 2a and the trailing electrode 2b that are brought into contact with the welding workpiece W, by the current/voltage detectors 6 and 7. Here, the voltage detecting step detects voltages on the leading electrode 2a and the trailing electrode 2b which are applied with voltages by the welding power supplies 4 and 5 and are brought into contact with a predetermined part of the welding workpiece W in that state, by the current/voltage detectors 6 and 7, respectively.

The electrode position control method according to an embodiment can detect the relative position of the welding workpiece W with respect to the leading electrode 2a and the trailing electrode 2b, by sensing the welding workpiece W by using the leading electrode 2a and the trailing electrode 2b that are being applied with voltages. This makes it possible to detect whether or not the position of the welding workpiece W being placed differs from a previously taught position, that is, the presence/absence and degree of positional displacement of each of the leading electrode 2a and the trailing electrode 2b with respect to the weld line.

It is preferable that the voltage detecting step detect the voltages when touch sensing the left and right walls of the groove of the welding workpiece W by the leading electrode 2a and the trailing electrode 2b. Touch sensing is a function for teaching the actual position of the welding workpiece W to the robot, and is carried out as follows. That is, by exploiting the fact that when wires projected from individual torches are brought into contact with the welding workpiece W while being applied with voltages, the voltages on the wires drop (this voltage decrease is an example of electrical changes in the voltages in the sensing step according to the present invention), the position where this voltage decrease has occurred is stored as the position of the welding workpiece W. Then, the positions of the left and right walls of the groove are acquired by touch sensing, and the midsection between the two walls is taken as the groove center position. In this way, the electrode position control method according to an embodiment can detect the groove center position of the welding workpiece W with respect to the leading electrode 2a and the trailing electrode 2b, by touch sensing the left and right walls of the groove of the welding workpiece W by using the leading electrode 2a and the trailing electrode 2b that are being applied with voltages. Then, as will be described later, by comparing this groove center position with the current positions of the leading electrode 2a and trailing electrode 2b, it is possible to detect the presence/absence and degree of positional displacement of each of the leading electrode 2a and the trailing electrode 2b with respect to the weld line.

It is preferable that the voltage detecting step detect the voltages when touch sensing the left and right walls of the groove of the welding workpiece W by the leading electrode 2a and the trailing electrode 2b, while moving the welding torch 2 linearly with respect to the weld line, or rotating the welding torch 2 about a predetermined rotation center. The electrode position control method according to an embodiment can change the method of moving the welding torch 2 during touch sensing in accordance with the shape of the groove of the welding workpiece W, by performing touch sensing while moving the welding torch 2 linearly with respect to the weld line or rotating the welding torch 2 about a predetermined rotation center in this way. Therefore, the presence/absence and degree of positional displacement of each of the leading electrode 2a and the trailing electrode 2b with respect to the weld line can be detected irrespective of the shape of the groove of the welding workpiece W.

(2) Sensing Step

The sensing step is a step of detecting positional information of the welding workpiece W from electrical changes in the voltages on the leading electrode 2a and the trailing electrode 2b detected in the voltage detecting step, by the sensing processing section 12. While in the sensing step all kinds of positional information of the welding workpiece W can be detected from electrical changes in the voltages on the leading electrode 2a and the trailing electrode 2b, this embodiment uses positional information such as the groove center position, groove left-wall position, and groove right-wall position of the welding workpiece W, among those positional information. Since the specific method of detecting positional information of the welding workpiece W from electrical changes in the voltages on the leading electrode 2a and the trailing electrode 2b is already known, description thereof is omitted herein.

It is preferable that the sensing step detect the groove center position of the welding workpiece W, from the electrical changes in the voltages on the leading electrode 2a and the trailing electrode 2b detected in the voltage detecting step, by the sensing processing section 12. By detecting the groove center position of the welding workpiece W in this way, as will be described later, the electrode position control method according to an embodiment can detect the presence/absence and degree of positional displacement of each of the leading electrode 2a and the trailing electrode 2b with respect to the weld line, by comparing this center groove position with the current positions of the leading electrode 2a and trailing electrode 2b.

(3) Correction Amount Calculating Step

The correction amount calculating step is a step of calculating a correction amount for correcting for positional displacement of each of the leading electrode 2a and the trailing electrode 2b with respect to a weld line that has been previously taught, from the positional information of the welding workpiece W detected in the sensing step, by the correction amount calculation processing section 16. More specifically, the correction amount calculating step can be roughly divided into a leading electrode correction amount calculating step, a trailing electrode correction amount calculating step, and a rotation center correction amount calculating step.

(3-1) Leading Electrode Correction Amount Calculating Step

The leading electrode correction amount calculating step is a step of calculating a leading electrode correction amount for correcting for positional displacement of the leading electrode 2a, from the groove center position calculated in the sensing step, and the current position of the leading electrode 2a, by the leading electrode correction amount calculating section 16a. Since the specific procedure for calculating a leading electrode correction amount is already known, description thereof is omitted herein.

(3-2) Trailing Electrode Correction Amount Calculating Step

The trailing electrode correction amount calculating step is a step of calculating a trailing electrode correction amount for correcting for positional displacement of the trailing electrode 2b, from the groove center position calculated in the sensing step, the current position of the trailing electrode 2b, and the distance between the leading electrode 2a and the trailing electrode 2b, by the trailing electrode correction amount calculating section 16b. The specific procedure for calculating a trailing electrode correction amount will be described later.

(3-3) Rotation Center Correction Amount Calculating Step

The rotation center correction amount calculating step is a step of calculating a rotation center correction amount for correcting for positional displacement of the leading electrode 2a which occurs due to correction of the position of the trailing electrode 2b in the position correcting step, by the rotation center correction amount calculating section 16c. The specific procedure for calculating a rotation center correction amount will be described later.

(4) Position Correcting Step

The position correcting step is a step of correcting the positions of the leading electrode 2a and trailing electrode 2b with respect to the weld line, and the rotation center of the welding torch 2, by adding or subtracting a leading electrode correction amount, a trailing electrode correction amount θ, and a rotation center correction amount Δtcp, respectively, by the robot path planning processing section 17.

Specifically, as mentioned above, the robot path planning processing section 17 adds or subtracts the leading electrode correction amount, the trailing electrode correction amount θ, and the rotation center correction amount Δtcp to or from the welding start position contained in teaching path information previously inputted from the teaching data section 11, that is, positional data of the leading electrode 2a with respect to the weld line, positional data of the trailing electrode 2b, and positional data of the rotation center, respectively, thereby correcting the corresponding pieces of positional data.

With the electrode position control method according to an embodiment of the present invention which performs the procedure as described above, even when the position of the weld line at the start of welding differs from the position as previously taught in tandem arc welding, the positions of the leading electrode 2a and trailing electrode 2b can be corrected appropriately in accordance with the position of the weld line. Therefore, a welding defect resulting from positional displacement of each of the leading electrode 2a and the trailing electrode 2b with respect to the weld line can be prevented appropriately.

(Specific Example of Electrode Position Control Method)

Hereinbelow, a specific example of the electrode position control method according to an embodiment of the present invention will be briefly described with reference to FIGS. 3A to 3E. It should be noted that in the following, a description will be given of a case in which TCP as the rotation center is set at the middle between the leading electrode 2a and the trailing electrode 2d, and in which the trailing electrode 2b rotates in the same plane, only the trailing electrode 2b is displaced with respect to the weld line, and no position correction is necessary for the leading electrode 2a.

Figure 3A:
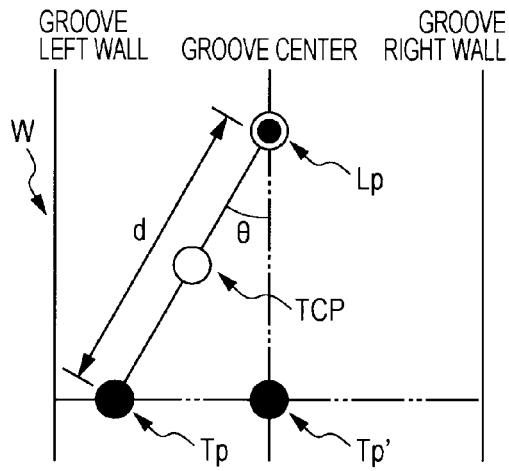
FIG. 3A to 3E are diagrams showing a specific example of an electrode position control method according to an embodiment of the present invention.

First, as shown in FIG. 3A, the trailing electrode correction amount calculating section 16b acquires the groove center position Tp' of the welding workpiece W, the current position Tp of the trailing electrode 2b, and the distance d between the leading electrode 2a and the trailing electrode 2b. At this time, as mentioned above, the groove center position Tp' of the welding workpiece W is inputted from the sensing processing section 12, the current position Tp of the trailing electrode 2b is acquired through a sensing process by the sensing processing section 12, and the distance d between the leading electrode 2a and the trailing electrode 2d is previously held in storage section (not shown) inside the robot controller 8. It should be noted that symbol Lp in FIG. 3A indicates the current position of the leading electrode 2a. Then, the trailing electrode correction amount calculating section 16b calculates the trailing electrode correction amount θ by the following equation (1):

$$\sin \theta = (|Tp - Tp'|)/d \qquad (1)$$

Figure 3B:
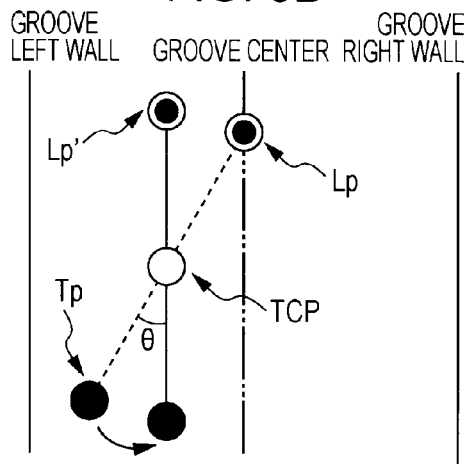

Next, the robot path planning processing section 17 adds the trailing electrode correction amount θ to the current positional data of the trailing electrode 2b, sends the resulting positional data to the servo driver for the robot 3 as a command value for each axis of the robot 3, and rotates the trailing electrode 2b of the welding torch 2 attached to the tip of the robot 3 by the trailing electrode correction amount θ, thereby correcting the position of the trailing electrode 2d. As a result, as shown in FIG. 3B, the position of the leading electrode 2a changes from Lp to Lp', which can sometimes cause the position of the leading electrode 2a to be displaced with respect to the weld line.

Figure 3C:
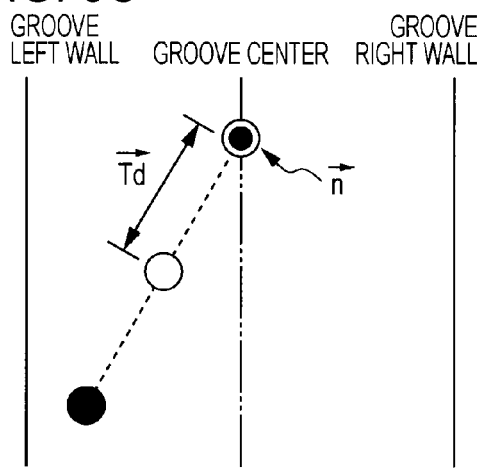

Next, the rotation center correction amount calculating section 16c performs coordinate transformation on the vector pointing from the leading electrode 2a to the rotation center from the tool coordinate system to the robot coordinate system, and calculates a reference leading electrode position vector n that serves as a reference as shown in FIG. 3C, by using equation (2) below. The reference leading electrode position vector n in equation (2) below denotes the position of the leading electrode 2a before the position of the trailing electrode 2b is corrected by using the trailing electrode correction amount θ. Also, $^{R}R_{T}$ denotes the torch attitude information mentioned above, which is a rotation matrix for transforming the coordinate system from the tool coordinate system to the robot coordinate system. A vector Td denotes the leading electrode-rotation center distance mentioned above, which is a vector pointing from the leading electrode 2a to the rotation center of the welding torch 2 on the tool coordinate system.

$$\vec{n} = {}^{R}R_{T} \cdot \vec{Td} \qquad (2)$$

Figure 3D:
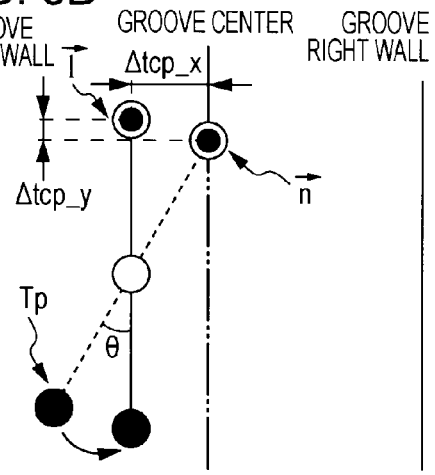

Next, by using equation (3) below, the rotation center correction amount calculating section 16c rotates the reference leading electrode position vector n by θ (α,β=0, γ=0) by using a rotation matrix $R_\alpha$, and calculates the current leading electrode position vector 1 as shown in FIG. 3D. At this time, θ mentioned above is the trailing electrode correction amount (α: roll, β: pitch, γ: yaw). The current leading electrode position vector 1 in equation (3) below denotes the position of the leading electrode 2a after the position of the trailing electrode 2b is corrected by using the trailing electrode correction amount θ.

$$\vec{l} = R_\alpha \cdot \vec{n} \qquad (3)$$

Next, by using equation (4) below, the rotation center correction amount calculating section 16c takes the difference between the reference leading electrode position vector n and the current leading electrode position vector 1, and calculates a rotation center correction amount Δtcp including Δtcp_x in the x-axis direction and Δtcp_y in the y-axis direction, as shown in FIG. 3D.

$$\Delta tcp = \vec{n} - \vec{l} \qquad (4)$$

Figure 3E:
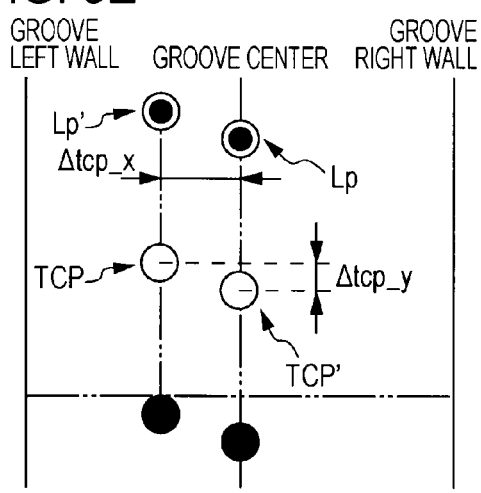

Next, as shown in FIG. 3E, by using equation (5) below, the robot path planning processing section 17 adds the rotation center correction amount Δtcp to the current rotation center TCP, thereby calculating a target rotation center TCP'.

$$TCP' = TCP + \Delta tcp \qquad (5)$$

Then, the robot path planning processing section 17 sends the target rotation center TCP' to the servo driver for the robot 3 as a command value for each axis of the robot 3, and corrects the position of the rotation center of the welding torch 2 attached to the tip of the robot 3.

With the electrode position control method according to an embodiment of the present invention which performs the above-mentioned procedure, the position of the trailing electrode 2b can be corrected by using an arbitrary rotation center. For example, in a case where, as shown in the left diagram of FIG. 4A, TCP is set at the leading electrode 2a and positional displacement occurs only in the trailing electrode 2b, as shown in the right diagram of FIG. 4A, by correcting the position of the trailing electrode 2b by using the trailing electrode correction amount θ with the leading electrode 2a taken as an axis, position correction can be performed in one step.

On the other hand, in a case where, as shown in the left diagram of FIG. 4C, TCP is set at the middle between the leading electrode 2a and the trailing electrode 2b, as shown in the right diagram of FIG. 4D, if the position of the trailing electrode 2b is corrected by using the trailing electrode correction amount θ with this TCP taken as an axis, positional displacement occurs in the leading electrode 2a.

However, with the electrode position control method according to an embodiment of the present invention, in addition to the leading electrode correction amount and the trailing electrode correction amount, the rotation center correction amount for correcting the rotation center of the welding torch 2 is calculated to thereby also correct the rotation center of the welding torch 2. Consequently, even when the position of the trailing electrode 2b is corrected by using an arbitrary rotation center, as shown in the bottom diagram of FIG. 4E, no displacement occurs in the position of the leading electrode 2a due to the position correction of the trailing electrode 2b. Therefore, the positions of the leading electrode 2a and trailing electrode 2b with respect to the weld line can be corrected with greater reliability in accordance with the position of the weld line.

Figure 5:
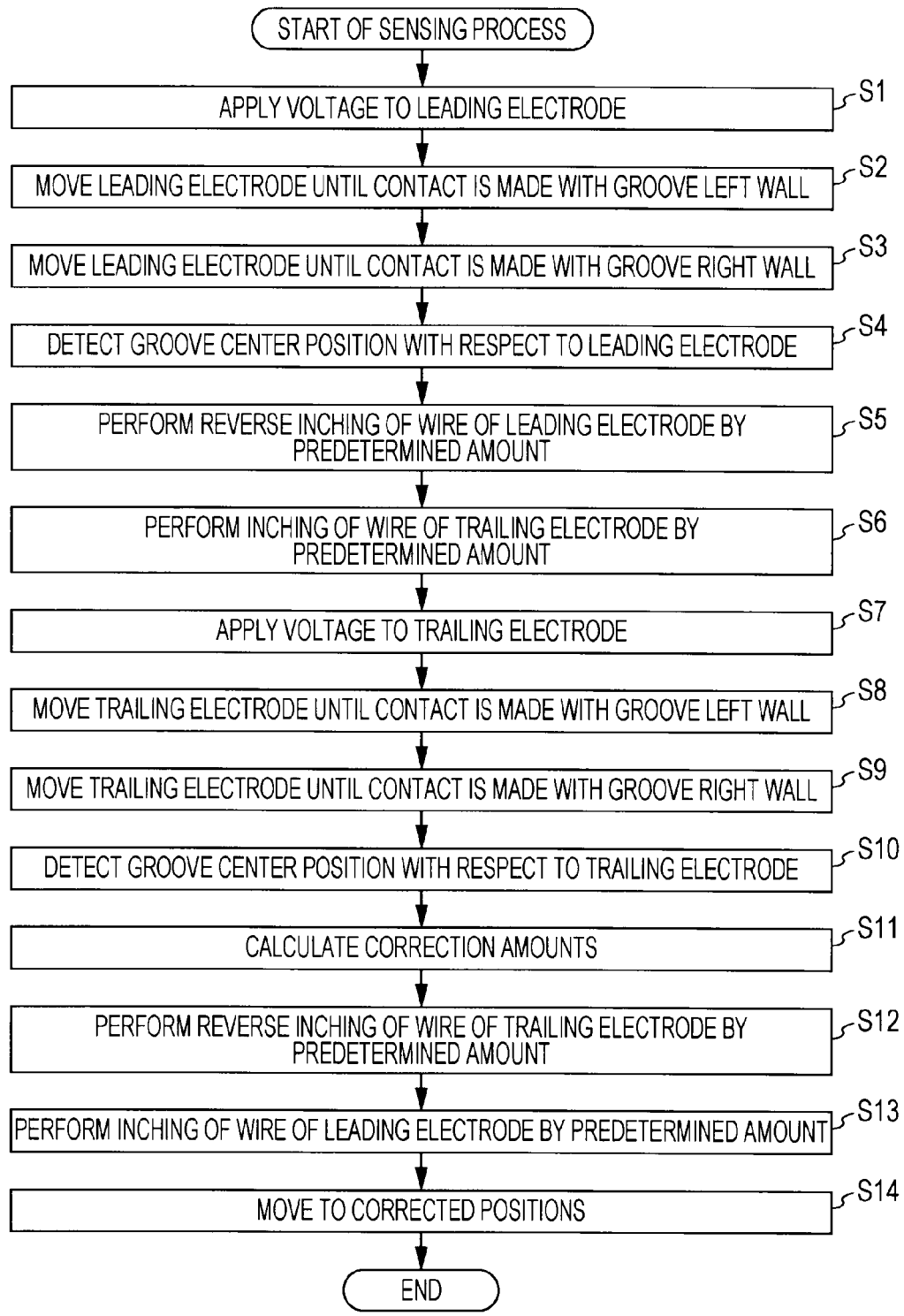
FIG. 5 is a flowchart showing an example of the process flow of the electrode position control method according to an embodiment of the present invention.

Next, an example of the processing flow of the electrode position control method according to an embodiment will be briefly described with reference to FIG. 5 and FIGS. 6A and 6B. First, when a sensing process starts, the welding power supply 4 applies a predetermined voltage to the leading electrode 2a (step S1). Next, as shown in FIG. 6A, the robot controller 8 causes the leading electrode 2a to move via the robot 3 until the welding wire 10a makes contact with the left wall of the groove (step S2). Then, the current/voltage detector 6 detects the voltage on the leading electrode 2a that is making contact with the left wall of the groove. Next, as shown in FIG. 6A, the robot controller 8 causes the leading electrode 2a to move via the robot 3 until the welding wire 10a makes contact with the right wall of the groove (step S3). Then, the current/voltage detector 6 detects the voltage on the leading electrode 2a that is making contact with the right wall of the groove.

Next, the sensing processing section 12 detects the groove center position with respect to the leading electrode 2a from electrical changes in detected voltage, by the above-described touch sensing, for example (step S4). Next, the robot controller 8 performs reverse inching of the welding wire 10a of the leading electrode 2a by a predetermined amount via the feed motor 9a (makes the projection length of the wire shorter by the predetermined amount) (step S5). Next, the robot controller 8 performs inching of the welding wire 10b of the trailing electrode 2b by a predetermined amount via the feed motor 9b (makes the projection length of the wire longer by the predetermined amount) (step S6). Step S5 and step S6 mentioned above are steps for switching the projection length of the trailing electrode wire, which has been made shorter than that of the leading electrode wire so that the wire of the trailing electrode does not make contact with the workpiece and bends while sensing is performed by the leading electrode, to become conversely longer than the projection length of the leading electrode in order to perform sensing by the trailing electrode.

Next, the welding power supply 5 applies a predetermined voltage to the trailing electrode 2b (step S7). Next, as shown in FIG. 6B, the robot controller 8 causes the trailing electrode 2b to move via the robot 3 until the welding wire 10b makes contact with the left wall of the groove (step S8). Then, the current/voltage detector 7 detects the voltage on the trailing electrode 2b that is making contact with the left wall of the groove. Next, as shown in FIG. 6B, the robot controller 8 causes the trailing electrode 2b to move via the robot 3 until the welding wire 10b makes contact with the right wall of the groove (step S9). Then, the current/voltage detector 7 detects the voltage on the trailing electrode 2b that is making contact with the right wall of the groove.

Next, the sensing processing section 12 detects the groove center position with respect to the trailing electrode 2b from electrical changes in detected voltage (step S10). Next, the correction amount calculation processing section 16 calculates individual correction amounts from the groove center position, the current positions of the leading electrode 2a and trailing electrode 2b, and so on (step S11). The procedures for calculating the individual correction amounts are the same as those mentioned above. Next, the robot controller 8 performs reverse inching of the welding wire 10b of the trailing electrode 2b by a predetermined amount via the feed motor 9b (step S12). Next, the robot controller 8 performs inching of the welding wire 10a of the leading electrode 2a by a predetermined amount via the feed motor 9a (step S13). Then, the positions of the leading electrode 2a and trailing electrode 2b are moved to the corrected positions (step S14), and the processing ends.

While the electrode position control method, the robot controller 8 for the tandem arc welding system 1, and the tandem arc welding system 1 according to the present invention have been described by way of specific modes for carrying out the present invention, the scope of the present invention is not bound to these descriptions but should be construed broadly on the basis of the description of the claims. It is needless to mention that various modifications, alterations, and so on made on the basis of these descriptions fall within the scope of the present invention.

For example, in the electrode position control method, the robot controller 8, and the tandem arc welding system 1 according to the above-mentioned embodiments, the sensing process is performed by detecting voltages on the leading electrode 2a and the trailing electrode 2b by the current/voltage detectors (current/voltage detecting means) 6 and 7, respectively, and exploiting electrical changes in the voltages. However, the sensing process may be performed by detecting currents on the leading electrode 2a and the trailing electrode 2b by the current/voltage detectors (current/voltage detecting means) 6 and 7, respectively, and exploiting electrical changes in the currents. As the electrical changes in the currents in this case, for example, the presence/absence of a short circuit may be exploited.

What is claimed is:

1. An electrode position control method for tandem arc welding which controls positions of a leading electrode and a trailing electrode with respect to a weld line prior to start of welding a welding workpiece, comprising:
   a voltage applying step of applying a voltage to the leading electrode and the trailing electrode;
   a voltage detecting step, performed during the voltage applying step, of bringing the leading electrode and the trailing electrode into contact with the welding workpiece to be welded and detecting voltages on the leading electrode and the trailing electrode that are brought into contact with the welding workpiece to be welded, wherein said voltage has a value that does not generate an arc between the welding workpiece and the respective leading electrode or trailing electrode when the leading electrode and the trailing electrode have not yet been brought into contact with the welding workpiece;
   a sensing step of detecting positional information of the welding workpiece from electrical changes in the voltages on the leading electrode and the trailing electrode detected in the voltage detecting step;
   a correction amount calculating step of calculating a correction amount for correcting for positional displacement of each of the leading electrode and the trailing electrode with respect to the weld line that has been previously taught, from the positional information of the welding workpiece detected in the sensing step; and
   a position correcting step of correcting the positions of the leading electrode and the trailing electrode with respect to the weld line, by adding or subtracting the correction amount calculated in the correction amount calculating step.

2. The electrode position control method for tandem arc welding according to claim 1, wherein:
   the voltage detecting step detects voltages when touch sensing left and right walls of a groove of the welding workpiece by the leading electrode and the trailing electrode;
   the sensing step detects a groove center position of the welding workpiece, from the electrical changes in the voltages on the leading electrode and the trailing electrode detected in the voltage detecting step;
   the correction amount calculating step includes a leading electrode correction amount calculating step of calculating a leading electrode correction amount for correcting for positional displacement of the leading electrode, from the groove center position calculated in the sensing step, and a current position of the leading electrode, and a trailing electrode correction amount calculating step of calculating a trailing electrode correction amount for correcting for positional displacement of the trailing electrode, from the groove center position calculated in the sensing step, a current position of the trailing electrode, and a distance between the leading electrode and the trailing electrode; and
   the position correcting step corrects the positions of the leading electrode and the trailing electrode with respect to the weld line by adding or subtracting the leading electrode correction amount and the trailing electrode correction amount, respectively.

3. The electrode position control method for tandem arc welding according to claim 2, wherein:
   the voltage detecting step performs touch sensing on the left and right walls of the groove of the welding workpiece by the leading electrode and the trailing electrode, while moving the welding torch linearly with respect to the weld line, or rotating the welding torch about a predetermined rotation center.

4. The electrode position control method for tandem arc welding according to claim 3, wherein:
   the correction amount calculating step further includes a rotation center correction amount calculating step of calculating a rotation center correction amount for correcting for positional displacement of the leading electrode which occurs due to the correction of the position of the trailing electrode in the position correcting step; and the position correcting step corrects the positions of the leading electrode and the trailing electrode with respect to the weld line, and a rotation center of the welding torch, by adding or subtracting the leading electrode correction amount, the trailing electrode correction amount, and the rotation center correction amount, respectively.

5. The electrode position control method for tandem arc welding according to claim 4, wherein the rotation center correction amount calculating step calculates a reference position of the leading electrode, from a distance between the leading electrode and the rotation center of the welding torch, and torch attitude information indicating an attitude of the welding torch with reference to a robot to a tip of which the welding torch is attached, and calculates the rotation center correction amount from the reference position of the leading electrode and the trailing electrode correction amount, by determining a difference between a position of the leading electrode before correction is made using the trailing electrode correction amount, and a position of the leading electrode after correction is made using the trailing electrode correction amount.

6. A tandem arc welding system which performs welding while following a weld line, comprising:
a welding torch having a leading electrode and a trailing electrode arranged at a predetermined inter-electrode distance in a direction in which welding proceeds;
welding power supplies that respectively supply welding power to the leading electrode and the trailing electrode, the welding power supplies further being configured to supply power to the leading electrode and the trailing electrode with a value that does not generate an arc between the welding workpiece and the respective leading electrode or trailing electrode;
a robot that moves or rotates the welding torch attached to its tip with respect to the weld line;
a welding power supply that supplies power to the leading electrode and the trailing electrode;
a current/voltage detector that detects at least one of currents and voltages on the leading electrode and the trailing electrode; and
a robot controller that controls positions of the leading electrode and the trailing electrode with respect to the weld line prior to start of welding, wherein the robot controller includes a sensing processing section that detects positional information of a welding workpiece to be welded, from electrical changes in the voltages on the leading electrode and the trailing electrode detected by the current/voltage detector at a time when the welding power supplies power to the leading electrode and the trailing electrode with a value that does not generate an arc between the welding workpiece and the respective leading electrode or trailing electrode and the leading electrode and trailing electrode are not in contact with the welding workpiece, a correction amount calculation processing section that calculates a correction amount for correcting for positional displacement of each of the leading electrode and the trailing electrode with respect to the weld line that has been previously taught, from the positional information of the welding workpiece, and a robot path planning processing section that corrects the positions of the leading electrode and the trailing electrode with respect to the weld line, by adding or subtracting the correction amount.

7. A robot controller in a tandem arc welding system which performs welding while following a weld line, the tandem arc welding system comprising a welding torch having a leading electrode and a trailing electrode arranged at a predetermined inter-electrode distance in a direction in which welding proceeds; welding power supplies that respectively supply welding power to the leading electrode and the trailing electrode, the welding power supplies further being configured to supply power to the leading electrode and the trailing electrode with a value that does not generate an arc between the welding workpiece and the respective leading electrode or trailing electrode; and a robot that moves or rotates the welding torch attached to its tip with respect to the weld line; a welding power supply that supplies power to the leading electrode and the trailing electrode; a current/voltage detector that detects at least one of currents and voltages on the leading electrode and the trailing electrode, wherein the robot controller controls positions of the leading electrode and the trailing electrode with respect to the weld line prior to start of welding, and includes:
a sensing processing section that detects positional information of a welding workpiece to be welded, from electrical changes in the voltages on the leading electrode and the trailing electrode detected by the current/voltage detector at a time when the welding power supplies power to the leading electrode and the trailing electrode with a value that does not generate an arc between the welding workpiece and the respective leading electrode or trailing electrode and the leading electrode and trailing electrode are not in contact with the welding workpiece;
a correction amount calculation processing section that calculates a correction amount for correcting for positional displacement of each of the leading electrode and the trailing electrode with respect to the weld line that has been previously taught, from the positional information of the welding workpiece; and
a robot path planning processing section that corrects the positions of the leading electrode and the trailing electrode with respect to the weld line, by adding or subtracting the correction amount.

* * * * *